United States Patent
Zhang et al.

(10) Patent No.: US 9,256,092 B2
(45) Date of Patent: Feb. 9, 2016

(54) BACKLIGHT MODULE AND LIQUID CRYSTAL DISPLAY DEVICE

(75) Inventors: Yanxue Zhang, Guangdong (CN); Yuchun Hsiao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 271 days.

(21) Appl. No.: 13/695,684

(22) PCT Filed: Sep. 13, 2012

(86) PCT No.: PCT/CN2012/081357
§ 371 (c)(1),
(2), (4) Date: Nov. 1, 2012

(87) PCT Pub. No.: WO2014/036751
PCT Pub. Date: Mar. 13, 2014

(65) Prior Publication Data
US 2014/0063405 A1    Mar. 6, 2014

(30) Foreign Application Priority Data

Sep. 5, 2012    (CN) .......................... 2012 1 0325122

(51) Int. Cl.
*G02F 1/1333*    (2006.01)
(52) U.S. Cl.
CPC ................................ *G02F 1/133308* (2013.01)

(58) Field of Classification Search
CPC .......... G02F 2001/13332; G02F 2001/133331; G02F 2001/133328; G02F 1/133308; G02F 2001/133322; G02F 2001/133325
See application file for complete search history.

(56) References Cited

U.S. PATENT DOCUMENTS

| | | | | |
|---|---|---|---|---|
| 6,445,373 | B1 * | 9/2002 | Yamamoto | 345/102 |
| 2008/0129918 | A1 * | 6/2008 | Kim et al. | 349/58 |
| 2009/0267889 | A1 * | 10/2009 | Choi et al. | 345/102 |
| 2010/0328571 | A1 * | 12/2010 | Itaya | 349/58 |

* cited by examiner

*Primary Examiner* — Jessica M Merlin
(74) *Attorney, Agent, or Firm* — Andrew C. Cheng

(57) ABSTRACT

The present invention discloses a backlight module that includes a liquid crystal glass and a front frame. The front frame includes at most three successively-connected side frame members. The three side frame members are positionable on and hold down the liquid crystal glass. The present invention also discloses a backlight module, which includes a liquid crystal glass and a front frame, of which the front frame includes at most two side frame members that are opposite to each other. The two side frame members re positionable on and hold down the liquid crystal glass. The present invention also discloses a liquid crystal display device that uses the backlight module. The backlight module and the liquid crystal display device using the backlight module according to the present invention improve firmness of bonding between the liquid crystal glass and the front frame and lowers down cost of the backlight module.

8 Claims, 3 Drawing Sheets

BACKLIGHT MODULE AND LIQUID CRYSTAL DISPLAY DEVICE

CROSS REFERENCE TO RELATED APPLICATIONS

This application claims the priority of Chinese Patent Application No. 201210325122.9 filed on Sep. 5, 2012, the disclosure of which is incorporated herein by reference in its entirety.

BACKGROUND OF THE INVENTION

1. Field of the Invention

The present invention relates to the field of liquid crystal displaying, and in particular to a backlight module and a liquid crystal display device.

2. The Related Arts

A liquid crystal display device comprises a display module. To display an image, the display module needs backlighting to serve as a light source. The backlight source that is currently used includes CCFL (Cold Cathode Fluorescent Lamp) and LED (Light-Emitting Diode). Currently, LEDs are used as a novel light source, which shows the advantages of high brightness and low power consumption. Consequently, the LED backlighting is getting prevailing and is considered a trend of future design. However, LEDs also generate a large amount of heat. To ensure the light emission efficiency and the lifespan of the LEDs, an arrangement of heat dissipation must be provided for the LEDs.

As shown in FIG. 5, a partial schematic cross-sectional view of a conventional backlight module is shown. A front frame 8 is formed of four side frame members connected end by end. Each side frame member holds down and thus retains a piece of liquid crystal glass 9 in position. However, it is noted that such a structure suffers the following deficiencies:

(1) Each of the side frame members shows a different hold-down capability (which refers to contact area between the front frame 8 and the liquid crystal glass 9), whereby for a side frame member that provides a relatively small hold-down capability, once falling during transportation, the liquid crystal glass often detaches from the side frame member having the relatively small hold-down capability, leading to undesired impact between the liquid crystal glass and the front frame, which causes breaking or other product defects.

(2) The conventional design of front frame that has four side frame members is adverse to intensification of backlight module and is costly.

SUMMARY OF THE INVENTION

The technical issue to be addressed by the present invention is to provide a backlight module and a liquid crystal display device, which significantly improves firmness of bonding between a liquid crystal glass and a front frame and reduces the cost of backlight module.

To address the above technical issue, the present invention provides a backlight module, which comprises a liquid crystal glass and a front frame. The front frame comprises at most three successively connected side frame members. The three side frame members being positionable on and holding down the liquid crystal glass.

Preferably, the three side frame members comprise a long-side side frame member and two short-side side frame members.

Preferably, the three side frame members comprise two long-side side frame members and a short-side side frame member.

Preferably, the long-side side frame member and the short-side side frame members are connected to show, as a whole, a rectangular configuration.

Preferably, the backlight module further comprises at least one bonding section, which fixes the liquid crystal glass to a backlight source of the backlight module.

Preferably, the bonding section is arranged at a location opposite to the long-side side frame member or the short-side side frame member.

The present invention provides a backlight module, which comprises: a liquid crystal glass and a front frame. The front frame comprises at most two side frame members. The two side frame members are opposite to each other. The two side frame members are positionable on and hold down the liquid crystal glass.

Preferably, the two side frame members comprise two long-side side frame members or two short-side side frame members.

Preferably, the backlight module further comprises at least one bonding section, which fixes the liquid crystal glass to a backlight source of the backlight module.

The present invention also discloses a liquid crystal display device that comprises the above described backlight module.

The present invention provides a backlight module and a liquid crystal display device using the backlight module, wherein with the front frame being composed of three side frame members or two side frame members, the chance that the liquid crystal glass detaches from the front frame is reduced so as to avoid breaking or other deficiency caused by impact resulting from the liquid crystal glass detaching from the front frame thereby improving the quality of backlight module and lowering down cost of backlight module.

DETAILED DESCRIPTION OF THE PREFERRED EMBODIMENTS

A description will be given to preferred embodiments of the present invention, reference being had to the attached drawings.

Figure 1:
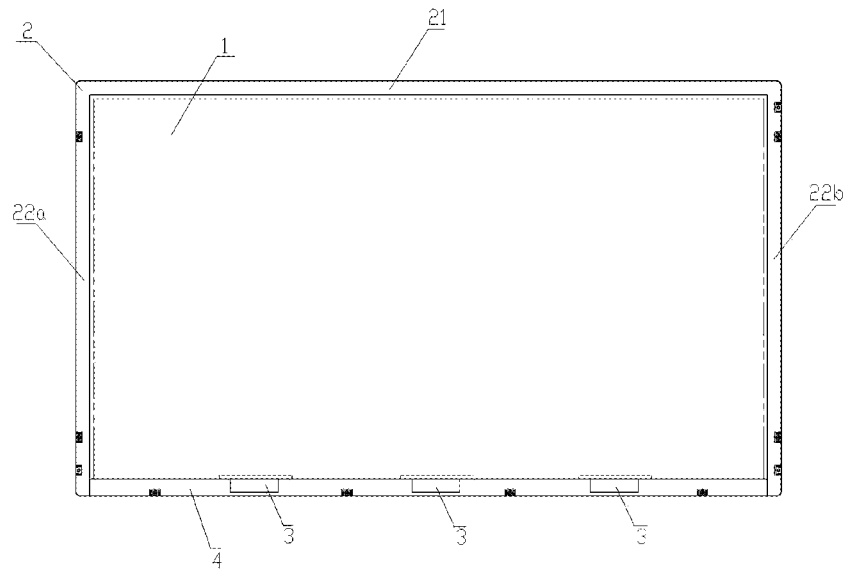
FIG. 1 is a schematic view showing a front frame of a backlight module according to a first embodiment of the present invention.
Figure 2:
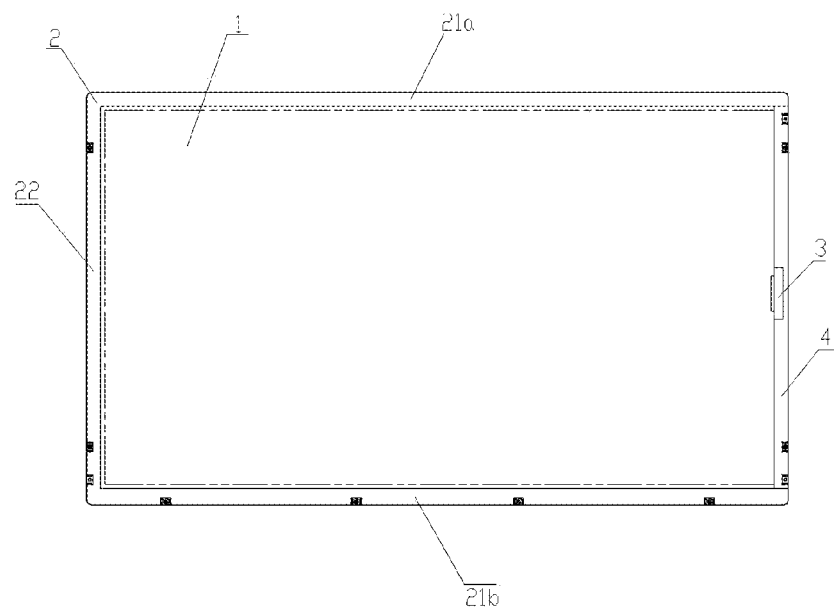
FIG. 2 is a schematic view showing a front frame of a backlight module according to a second embodiment of the present invention.

As shown in FIGS. 1 and 2, an embodiment of the present invention provides a backlight module, which comprises: a liquid crystal glass 1 and a front frame 2, wherein the front frame 2 comprises at most three successively connected side frame members and the three side frame members are positioned on and hold down the liquid crystal glass 1.

Figure 3:
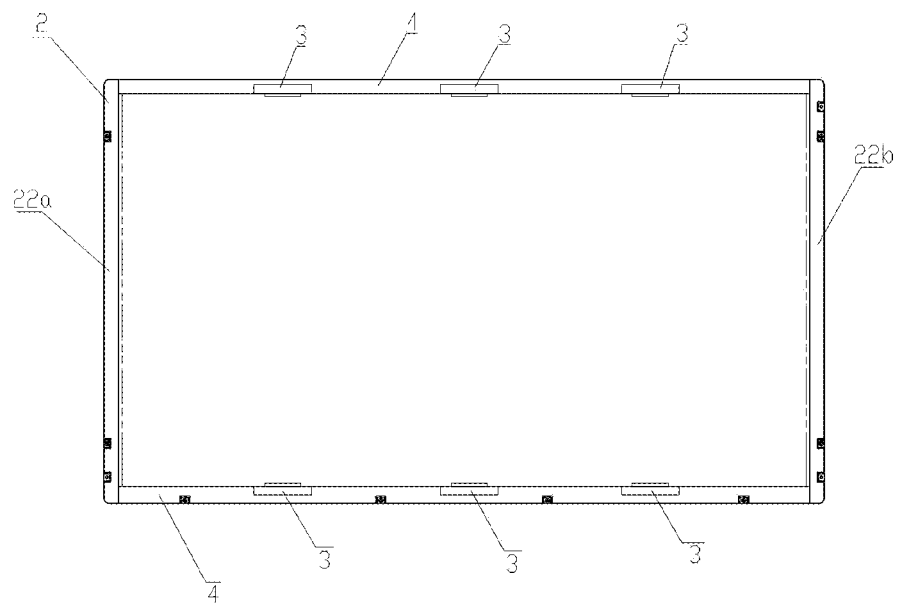
FIG. 3 is a schematic view showing a front frame of a backlight module according to a third embodiment of the present invention.
Figure 4:
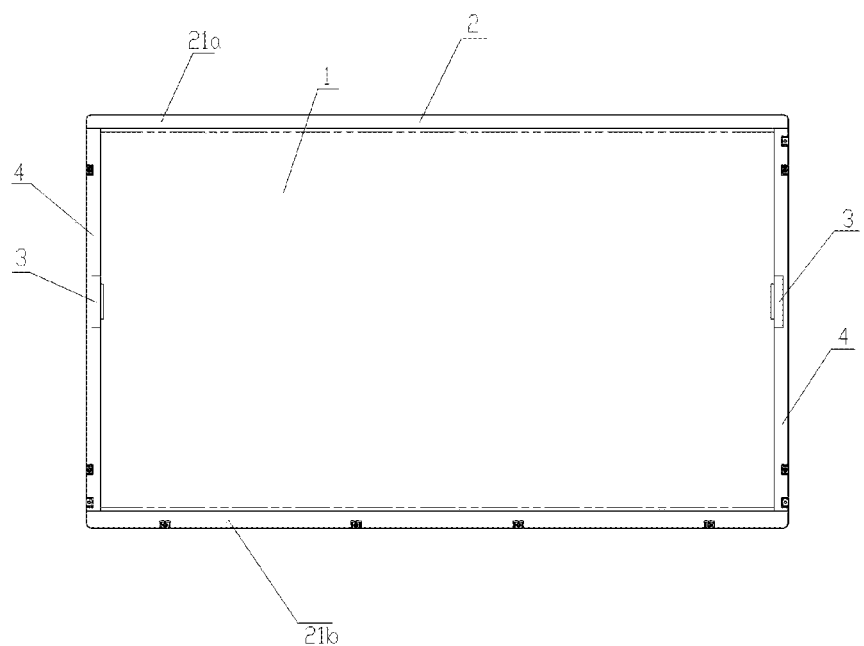
FIG. 4 is a schematic view showing a front frame of a backlight module according to a fourth embodiment of the present invention.
Figure 5:
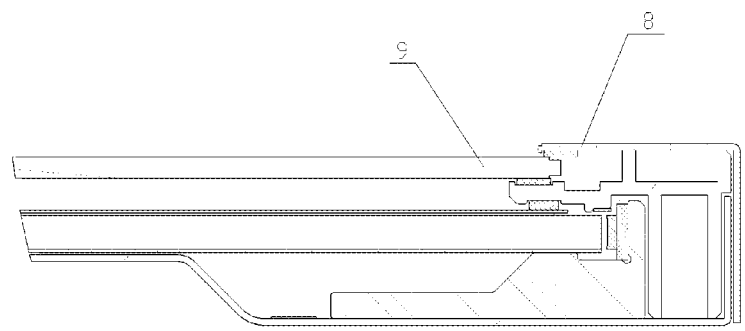
FIG. 5 a partial schematic cross-sectional view of a conventional backlight module.

As shown in FIGS. 3 and 4, an embodiment of the present invention provides a backlight module, which comprises: a liquid crystal glass 1 and a front frame 2, wherein the front frame 2 comprises two side frame members that are arranged opposite to each other and are positioned on and hold down the liquid crystal glass 1.

The present invention provides a backlight module of which the front frame comprises three side frame members or two side frame members in order to omit a portion of the front frame that provides a relatively small hold-down capability with respect to the liquid crystal glass 1 and reduce the chance that the liquid crystal glass 1 is detached from the front frame 2 to thereby avoid breaking or other deficiency caused by impact resulting from the liquid crystal glass 1 detaching from the front frame 2, improve the quality of the backlight module, and lower down the cost of the backlight module. Specific embodiments will be discussed to describe the structure of backlight module.

FIRST EMBODIMENT

Referring to FIG. 1, a backlight module according to the instant embodiment comprises a liquid crystal glass 1 and a front frame 2, wherein the front frame 2 only comprises three successively-connected side frame members, which are respectively a long-side side frame member 21 located at the top as shown in FIG. 1 and two short-side side frame members 22a, 22b respectively located at left and right laterals as shown in FIG. 1. The two short-side side frame members 22a, 22b are of identical length are respectively and perpendicularly connected to two ends of the long-side side frame member 21, whereby the long-side side frame member 21 and the short-side side frame members 22a, 22b are connected to show, as a whole, a rectangular configuration that matches the shape of the liquid crystal glass 1.

Bonding sections are arranged at locations opposite to the long-side side frame member 21 for reinforcing retention of the liquid crystal glass 1 at the location of an omitted side frame member. The bonding sections are arranged on a backlight source 4 that is located at the bottom as shown in FIG. 1. A specific embodiment of the backlight source includes a light source, a light guide plate, an optic film, or other structural parts.

To assemble the front frame 2 to the backlight module, the long-side side frame member 21 and the two short-side side frame members 22a, 22b are positioned on and hold down three side edges of the liquid crystal glass 1. The backlight source 4 that is located at the site where the omitted side frame member is located opposite to the long-side side frame member 21 comprises adhesive tapes 3 attached thereto, whereby the adhesive tapes 3 realize reinforcement of the liquid crystal glass 1. Specifically, two ends of each adhesive tape 3 are respectively bonded to the backlight source and the liquid crystal glass 1 of the backlight module.

In the instant embodiment, the adhesive tape 3 can be replaced by other bonding structures that fix the liquid crystal glass to a backlighting component of the backlight module, such as single-sided adhesive band and adhesive pad.

SECOND EMBODIMENT

A difference between the instant embodiment and the first embodiment is that the front frame 2 comprises three successively-connected side frame members that are respectively two long-side side frame members 21a, 21b and a short-side side frame member 22. The two long-side side frame members 21a, 21b are respectively located at the top and the bottom as shown in FIG. 2 and the short-side side frame member 22 is located at the left lateral as shown in FIG. 2.

In the instant embodiment, bonding sections are also arranged on a backlight source 4 that is located at the site where an omitted side frame member is located and is opposite to the short-side side frame member 22. The bonding sections can be adhesive tapes 3, adhesive bands, and adhesive pads, similar to those of the first embodiment with the number thereof being one or more according to a practical application.

THIRD EMBODIMENT

Referring to FIG. 3, a backlight module according to the instant embodiment comprises a liquid crystal glass 1 and a front frame 2, wherein the front frame 2 only comprises two short-side side frame members 22a, 22b. The two short-side side frame members 22a, 22b are arranged opposite to each other (such as left lateral and right lateral shown in FIG. 3). The two short-side side frame members 22a, 22b are positioned on and hold down the liquid crystal glass 1.

In the instant embodiment, bonding sections are arranged on backlight sources 4 between the two short-side side frame members 22a, 22b (such as the top and/or the bottom shown in FIG. 3) to reinforce the retention of the liquid crystal glass 1 at locations of omitted side frame members.

To assemble the front frame 2 to the backlight module, the two short-side side frame members 22a, 22b are positioned on and hold down two opposite side edges of the liquid crystal glass 1. The backlight sources 4 that are located between the two short-side side frame members 22a, 22b comprise adhesive tapes 3 attached thereto.

FOURTH EMBODIMENT

Referring to FIG. 4, a difference between the instant embodiment and the third embodiment is that the front frame 2 comprises only two side frame members that are two long-side side frame members 21a, 21b. Bonding sections are provided on backlight sources 4 that are arranged between the long-side side frame members 21a, 21b (such as the left lateral and the right lateral shown in FIG. 4).

In each of the first to fourth embodiments, the bonding sections can be omitted in assembling a small-sized liquid crystal glass. One or two side frame members of the front frame that provide a relatively small hold-down capability with respect to the liquid crystal glass according to a specific design of the backlight module. The present invention also discloses a liquid crystal display device, which comprises a backlight module according to any one of the above described embodiments of which details will be omitted here.

Practicing the backlight module according to the present invention and a liquid crystal display device using the backlight module provides the following benefits. With the front frame being composed of three side frame members or two side frame members, the chance that the liquid crystal glass detaches from the front frame is reduced so as to avoid breaking or other deficiency caused by impact resulting from the liquid crystal glass detaching from the front frame thereby improving the quality of backlight module and lowering down cost of backlight module.

What is claimed is:

1. A backlight module, comprising: a liquid crystal glass that is rectangular and has four edges and a front frame, wherein the front frame comprises three successively connected side frame members to show, as a whole, a rectangular configuration corresponding to the liquid crystal glass and having one side open and corresponding in position to a backlight source, the three side frame members being respectively positionable on and holding down three of the four edges of the liquid crystal glass, a fourth one of the four edges of the liquid crystal glass being arranged to correspond to the open side of the front frame and free of engagement with the front frame, the fourth edge of the liquid crystal glass fixed to the backlight source of the backlight module by at least one adhesive bonding section, wherein the three edges of the liquid crystal glass are respectively and solely in contact engagement with and held down and thus fixed in position by the three side frame members of the front frame and are spaced from and free of adhesive bonding to the backlight source and the fourth edge of the liquid crystal glass corresponding to the open side of the front frame and free of engagement with the front frame is solely fixed in position by the at least one adhesive bonding section attached between the fourth edge of the liquid crystal glass and the backlight source of the backlight module.

2. The backlight module as claimed in claim 1, wherein the three side frame members comprise a long-side side frame member and two short-side side frame members that are opposite to each other, the open side of the front frame being opposite to and distant from the long-side side frame member.

3. The backlight module as claimed in claim 2, wherein the bonding section is arranged on the liquid crystal glass and the backlight source of the backlight module at a location corresponding to the open side of the front frame and distant from the long-side frame member;

the backlight source comprising a light source, a light guide plate, an optic component, or other structural member of the backlight module.

4. The backlight module as claimed in claim 1, wherein the three side frame members comprise two long-side side frame members that are opposite to each other and a short-side side frame member that is opposite to the open side of the front frame.

5. The backlight module as claimed in claim 4, wherein the bonding section is arranged on the liquid crystal glass and the backlight source of the backlight module at a location corresponding to the open side of the front frame and distant from the short-side frame-member;

the backlight source comprising a light source, a light guide plate, an optic component, or other structural member of the backlight module.

6. A liquid crystal display device, wherein the liquid crystal display device comprises a backlight module, the backlight module comprising: a liquid crystal glass and a front frame, the front frame comprising three successively connected side frame members to show, as a whole, a rectangular configuration corresponding to the liquid crystal glass and having one side open and corresponding in position to a backlight source, the three side frame members being respectively positionable on and holding down three of the four edges of the liquid crystal glass, a fourth one of the four edges of the liquid crystal glass being arranged to correspond to the open side of the front frame and free of engagement with the front frame, the fourth edge of the liquid crystal glass fixed to the backlight source of the backlight module by at least one adhesive bonding section, wherein the three edges of the liquid crystal glass are respectively and solely in contact engagement with and held down and thus fixed in position by the three side frame members of the front frame and are spaced from and free of adhesive bonding to the backlight source and the fourth edge of the liquid crystal glass corresponding to the open side of the front frame and free of engagement with the front frame is solely fixed in position by the at least one adhesive bonding section attached between the fourth edge of the liquid crystal glass and the backlight source of the backlight module.

7. The liquid crystal display device as claimed in claim 6, wherein the three side frame members comprise a long-side side frame member and the two short-side side frame members that are opposite to each other, the open side of the front frame being opposite to and distant from the long-side side frame member.

8. The liquid crystal display device as claimed in claim 7, wherein the bonding section is arranged on the liquid crystal glass and the backlight source of the backlight module at a location corresponding to the open side of the front frame and distant from the long-side side frame member;

the backlight source comprising a light source, a light guide plate, an optic component, or other structural member of the backlight module.

* * * * *